United States Patent [19]  [11] 4,240,670
Zorn et al. [45] Dec. 23, 1980

[54] VEHICLE WHEEL COVERS

[75] Inventors: Edward Zorn, Encino; Bert J. Sherwood, Los Angeles; Fenton A. Liffick, Granada Hills, all of Calif.

[73] Assignee: Chemplate Corporation, Los Angeles, Calif.

[21] Appl. No.: 952,076

[22] Filed: Oct. 17, 1978

[51] Int. Cl.³ .............................................. B60B 7/06
[52] U.S. Cl. .............................. 301/9 DN; 301/36 R; 301/37 S; 301/108 S; 151/38
[58] Field of Search ........ 301/9, 9 AN, 9 DN, 9 DP, 301/9 SB, 36 R, 37 S, 37 R, 108 R, 108 S; 151/36, 38; 85/32 R, 35

[56] References Cited
U.S. PATENT DOCUMENTS

| | | | |
|---|---|---|---|
| 1,940,675 | 12/1933 | Crowther | 301/9 DN |
| 2,150,111 | 3/1939 | Tatter | 301/36 R |
| 2,277,843 | 3/1942 | Cambridge | 301/36 |
| 3,653,719 | 4/1972 | Osawa | 301/108 S |
| 3,860,297 | 1/1975 | Solis | 301/9 DN |

FOREIGN PATENT DOCUMENTS 254574  7/1926  United Kingdom ................ 301/108 S Primary Examiner—H. Grant Skaggs
Attorney, Agent, or Firm—I. Morley Drucker

[57] ABSTRACT

A wheel accessory, e.g., a full wheel cover or a hub cap has a mounting flange provided with openings which match the bolt pattern of the vehicle wheel. A majority of these openings are oversized with respect to the wheel's chamfered or ramped lug nuts so as to readily slip over them. The remaining openings are slightly undersized with respect to the major diameter of the chamfered lug nuts and require the removal of the corresponding lug nuts to allow mounting of the wheel accessory. The wheel accessory is held in place, in a non-interference fit, by expandable washers placed between the mounting flange and the chamfered end of the lug nuts corresponding to the undersized openings.

16 Claims, 5 Drawing Figures

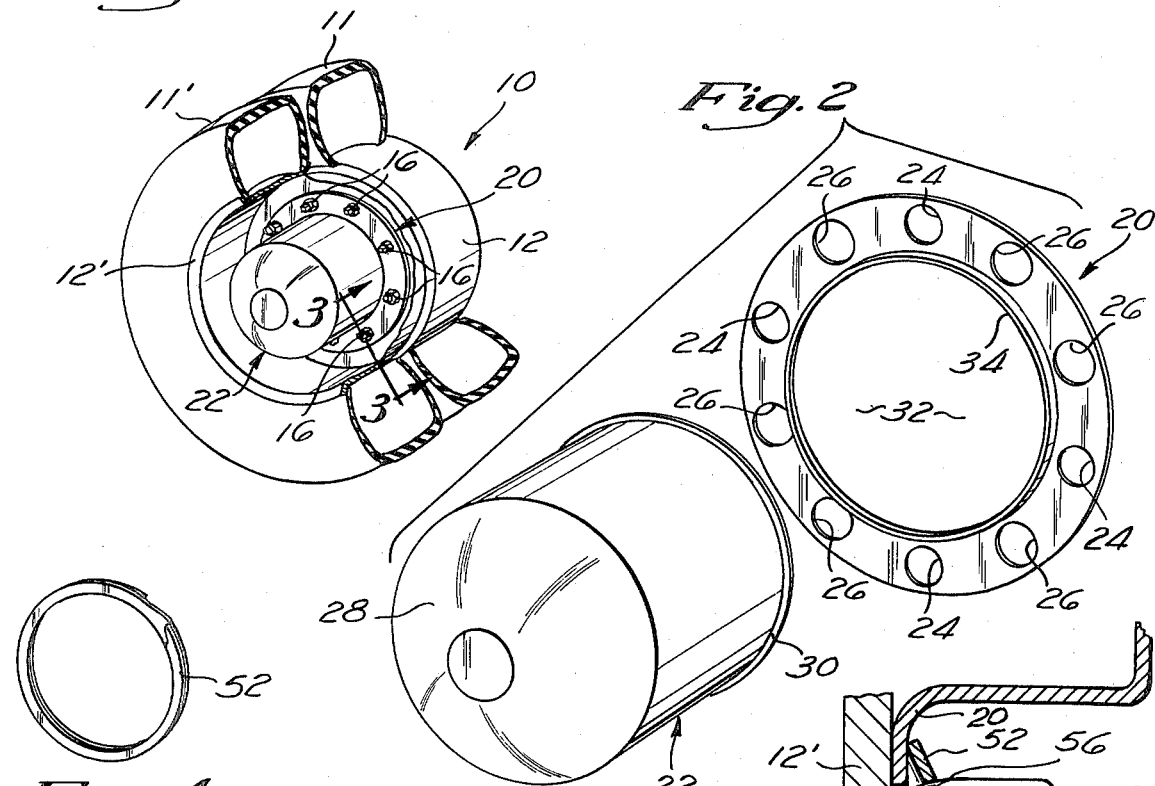

VEHICLE WHEEL COVERS

BACKGROUND OF THE INVENTION

1. Field of the Invention

The present invention relates generally to ornamental wheel accessories for vehicles, among which are included items known in the art as "hub caps," and more particularly, relates to full or partial wheel covers, axle covers, hub covers, or caps and chromed circular plates (or beauty rings) for use on wheels of heavy duty trucks.

2. Description of the Prior Art

Wheel covers, axle covers and hub caps for vehicles have been in widespread use for a long time. Generally, such devices serve a decorative or ornamental purpose by covering the aesthetically unfinished wheel, and also protect the axle or hub from accumulation of particles of debris, dirt, and dust.

Attempts have been made in the past to use the existing lug nuts on the wheel to also secure a wheel accessory, such as a wheel or axle cover. The results of such attempts have been unsatisfactory because the addition of the wheel or axle cover prevents the lug nuts from seating properly against the wheel, creating a potentially dangerous situation where the lug nuts are not properly seated and may loosen and be lost under normal road use. Further, some existing wheel or axle covers require removal of all lug nuts on the wheel for installation which necessitates jacking up the vehicle.

The present invention is an improvement in that the wheel accessory is retained by the existing lug nuts without interfering with the proper seating thereof against the wheel, and further does not require removal of the wheel or the jacking up of the vehicle because only a minority of the existing lug nuts need be removed for mounting of the wheel accessory.

SUMMARY OF THE INVENTION

The present invention comprises a wheel accessory, e.g., wheel cover or axle cover for use on a vehicle wheel which is secured to an axle hub having a plurality of bolts passing through suitable openings in the wheel, which is retained by tapered or chamfered lug nuts threaded onto the ends of said lug bolts.

The wheel accessory of this invention includes a mounting means such as a flange plate which has a plurality of apertures disposed in a pattern matching the pattern of conventional lug nuts of the wheel for which the accessory is intended.

A portion, or first set, of the apertures of the wheel accessory is slightly undersized with respect to the maximum outer diameter of the conventionally tapered lug nuts requiring that these lug nuts be first removed from the wheel to enable the wheel accessory to be mounted, by means of these lug nuts to the wheel.

The undersized set of apertures usually comprise a minor number of the total available apertures (e.g., 4 of 10) and the wheel accessory will thus be held onto the wheel only by a minor number of lug nuts.

The remaining set of apertures (e.g. 6 of 10) are oversized with respect to the lug nuts and allows the wheel accessory to be readily slipped over the remaining lug nuts. These remaining lug nuts do not retain the flange plate and the oversized apertures are therefore not restricted to any particular size or shape. Thus, the main purpose of the oversized apertures is to allow clearance for those lug nuts which are not used for mounting the accessory.

In order that the flange plate be retained by the lug nuts without interference fit between the undersized apertures and the lug nuts, resilient washers are provided. Specifically, one or more resilient washers are placed between the wheel and flange plate and concentrically with each undersized aperture so as to engage the tapering or ramp portion of the lug nut when the latter is threaded onto the lug bolt. As the tapered lug nut is torqued against the wheel, the ever increasing taper causes the resilient washers to expand radially, allowing the tapered portion of the lug nut to partially pass through said washer and through the aperture in the wheel accessory and to seat in a normal fashion against the wheel without any interference by the flange plate or the wheel accessory. The resilient washers are thus securely retained in an expanded state against the wheel accessory by the largest diameter portion of the lug nut taper, which portion of the taper does not normally engage the wheel. The combination of washers placed at each of the undersized apertures with the corresponding tapered lug nuts securely retains the wheel accessory against the vehicle wheel, without interference fit between the flange plate and the lug nut.

Since a minority of the lug nuts on any given wheel is utilized, and with the expandable washers is sufficient to hold the wheel accessory in place, the remaining majority of the lug nuts corresponding to the oversized apertures of the wheel accessory need not be, and is not, disturbed during mounting of the wheel accessory.

BRIEF DESCRIPTION OF THE DRAWINGS

FIG. 1 is a partially cutaway perspective view of a dual wheel assembly, such as is used on heavy duty vehicles, having mounted thereon an axle cover accessory and mounting flange of the present invention;

FIG. 2 is a perspective view of the preferred embodiment of the present invention but not showing the resilient washers;

FIG. 3 is a cross-sectional view taken along line 3—3 of FIG. 1 and includes a side view of a lug bolt passing through the wheel assembly and a partially cut-away side view of a compound lug nut threaded onto the lug bolt; and FIG. 4 is a perspective view of one form of an expandable washer included within the present invention.

FIG. 5 is a cross-section showing the a portion of the mounting means as an integral flanged wheel and axle cover member secured to the wheel by a conical disc washer and also showing a side view of a lug nut threaded onto the lug bolt.

DESCRIPTION OF THE PREFERRED EMBODIMENT

The embodiment of the present invention chosen by way of example only is a cover for a rear axle of a heavy duty truck.

Referring to FIG. 1, there is shown a partially cutaway dual wheel assembly 10 with two tires 11 and 11' mounted thereon. The wheel assembly comprises an inner dual 12 and an outer dual 12', each of which support tires 11, 11' respectively. Duals 12, 12' have ten aligned openings adapted to receive an equal number of lug bolts (not shown) extending from an axle hub 14 (shown in FIG. 3). Duals 12 and 12' are secured onto the lug bolts by means of standard lug nuts 16.

As seen in FIG. 2, the mounting means 20 for wheel accessory 22 is, preferably, fabricated in the form of a circular flange ring or plate having a series of ten circular apertures evenly spaced in a circular pattern concentric with said mounting means 20, the hole pattern matching the lug bolt pattern of wheel assembly 10. The said ten apertures include a first set of four apertures each numbered 24 in FIG. 2, and a second set of six apertures each numbered 26 in FIG. 2. The relationship of the diameters of apertures 24 and 26 is defined with respect to the maximum outer diameter of the standard lug nut 16, as will be described below.

FIG. 3 shows in partial cross section a detail of the dual wheel assembly of FIG. 1. A compound lug bolt and lug nut assembly 40 of standard design consists of lug bolt 42 extending from axle hub 14 through inner dual 12 and outer dual 12', a lug sleeve 44 which is threaded onto lug bolt 42 and is provided with a head portion 47 to retain the inner dual 12 when seated. Head portion 47 includes an oppositely bevelled spacer portion 46 which acts as a spacer between the inner and outer duals 12 and 12', respectively; and a standard tapered or ramped lug nut 16 which is threaded onto lug sleeve 44 and serves to retain outer dual 12'.

In order to mount the rear axle cover 22 to the vehicle wheel by means of the flange plate ring 20 of this invention, the four lug nuts 16 positioned corresponding to the undersized apertures 24 of the flange ring are removed and the oversized apertures 26 of the ring are then slipped over the remaining six lug nuts 16. The ring is, of course, at this point only hanging loosely from the wheel.

Preferably, one resilient washer 52 is slipped over each lug bolt protruding through the four apertures 24. As shown in FIG. 4, resilient washer 52 consists of a helically coiled resilient strip, preferably made of stainless steel although may other forms of resilient washer may be employed, as will be later set forth.

As shown in FIG. 3, lug nuts 16 are then threaded back onto the corresponding lug sleeves 44, with the tapered or ramped ends 48, passing through the washers 52; the inner end 54 of the ramped seat 48 seating into a standard recess 50 in outer dual 12' so as to securely engage and retain the latter.

The outer diameter of lug nut 16 increases toward the outer end 56 of the tapered or ramped seat 48, reaching a maximum outer diameter at the plane within which point 49 is found. The seat 48 of the standard tapered or ramped lug nut is spherically segmented. The diameter of the apertures 24 of the first set is slightly undersized with respect to said maximum outer diameter but sufficiently large so as not to interfere with the seating of lug nut 16 in recess 50. The apertures 26 of the second set are somewhat larger than said maximum outer diameter in order to avoid interference with the corresponding lug nuts which are not disturbed during mounting of the wheel cover.

The inner ends 54 of each of the lug nut seats 48 clear flange ring 20 through aperture 24 (one of the four apertures of the first set of apertures, each numbered 24 in FIG. 2) without making direct contact therewith. The outer end 56 of tapered seat 48 circumferentially engages resilient washer 52, causing it to expand radially as the lug nut 16 is torqued into seating engagement with recess 50 of outer dual 12'.

Due to the increasing taper presented by spherically segmented seat 48, washer 52 is urged into engagement with mounting means 20 which is thus held by friction between said washer 52 and outer dual 12'. The same process takes place at each of said apertures 24, so that in the preferred embodiment here described mounting means 20 is secured at four points.

The mounting means, i.e., ring 20 usually carries a separate cap or axle cover element 22 therewithin, one embodiment of which is shown in FIG. 2. Axle cover element 22 is a hollow cylinder adapted to slidably fit within the circular central opening 32 defined by inner rim 34 of mounting means 20. Axle cover element 22 preferably has a closed end 28 and is provided at the opposite end with an outwardly extending circumferential retaining flange 30 adapted to engage said rim 34 and be retained thereby when mounting means 20 is mounted onto a wheel as in FIG. 1 and in detailed cross-section in FIG. 3. Axle cover element 22 may have many possible external shapes. Also, within the scope of this invention is a one-piece axle cover comprising a cap element.

It will be appreciated that the number and relative location of the undersized apertures 24 may be varied although the preferred embodiment utilizes four such apertures non-adjacently selected from the ten apertures of mounting means 20 in a pattern which defines the corners of an imaginary rectangle. This arrangement is intended to provide a balanced distribution of washers about the wheel and to provide for ease of mounting by limiting to four the number of lug nuts that may be removed. However, the number of apertures 24 may be increased or decreased and their distribution pattern in mounting means 20 may also be altered.

Further, neither apertures 24 nor apertures 26 need be circular but may include a variety of shapes so long as proper dimensions are maintained. Specifically, apertures 26 include any cutouts in the mounting means provided for the purpose of clearing those lug nuts 16 which are not used for mounting of the wheel cover.

It will be also apparent to those skilled in the art that other types of resilient washers having a variety of designs, may be used such as split ring metal washers and conical disc washers among others, and a variety of materials including polyurethane, nylon, and neoprene rubber may also be employed without departing from the spirit and scope of this invention. Specifically included are washers of the Belleville type as shown in the embodiment of FIG. 5. Belleville washers are a form of conical disc washer designed to operate as a spring by deflecting between the cone and flat positions. These springs can be used in multiples, either back-to-back in series or stacked in parallel, to increase the spring action. Generally, this invention includes any resilient washer which will yield in response to the increasing taper 48 of the lug nut as it is torqued into place. The response may be by radial expansion or axial compression of the washer (or a combination of both), the I.D. of which is such as to engage the normally free outer end 56 of seat 48 of lug nut 16 so as not to interfere with the proper seating thereof. It will be understood that the term "washer" as used in the claims includes, but is not limited to, washers as shown and described with reference to FIGS. 3, 4 and 5.

Mounting means 20 may be adapted for use with wheels having any number and pattern of lug bolts by providing the appropriate number of openings 24, and 26, and in conjunction with resilient washers 52 may be used on any wheel having lug nuts which are provided with an adequate taper or ramp at the inner ends thereof, without the necessity of changing "original equipment" or standard lug nuts.

This invention provides a simple, quick, and convenient means of securing attachments to a vehicle wheel without the necessity of removing the wheel or jacking up the vehicle and without interfering with the normal and proper seating of the lug nuts against the wheel. While a rear axle cover is specifically shown and described herein other wheel accessories such as full or partial wheel covers, hub caps, hub covers and other wheel accessories may all be mounted by means of the flange plate and resilient washer combination of this invention. The flange plate and resilient washer combination is itself a wheel accessory.

It will be appreciated by those skilled in the art that many other modifications may be made in the embodiment here described without departing from the spirit and scope of the invention as defined in the appended claims.

We claim:

1. For a vehicle wheel mounted on an axle hub having a plurality of lug bolts which pass through openings in the wheel and secured by ramped lug nuts threaded onto the ends of said lug bolts, the ramp portion of said ramped lug nuts each having an inner ramped end normally seated within a recess of said wheel in a non-interference fit and a free outer ramped end, the improvement in mounting a wheel accessory which includes:

a mounting means having formed therein a first set of apertures slightly undersized with respect to the maximum outer diameter of said ramped lug nuts and a second set of apertures oversized with respect to said maximum outer diameter of said ramped lug nuts, the combined first and second sets of apertures being arranged in a pattern matching the pattern of said plurality of lug bolts with said first set of undersized apertures having a diameter sufficiently large to permit full seating of inner ramped ends of said ramped lug nuts securing said vehicle wheel in a non-interference fit, and said second set of oversized apertures fitting loosely around said ramped lug nuts and permitting also non-interference seating of said inner ramped ends of said ramped lug nuts; and a plurality of resilient washers each having a normal unexpanded inner diameter undersized with respect to said maximum outer diameter of said ramped lug nuts but of sufficiently large inner diameter to allow normal seating of said inner ramped ends of said ramped lug nuts in said wheel recesses, each of said resilient washers engaging only each of the said free outer ramped ends of those of said ramped lug nuts which are surrounded by said undersized apertures, to permit a non-interference fit with said inner ramped ends of said ramped lug nuts when said ramped lug nuts are torqued into normal seating engagement with said wheel, said resilient washers being thereby urged against said mounting to secure said mounting means to said vehicle wheel.

2. The wheel accessory of claim 1 wherein the first set of apertures is symmetrically distributed within the second set of apertures.

3. The wheel accessory of claim 1 wherein said mounting means defines a central opening.

4. The wheel accessory of claim 1 wherein said mounting means is a flange plate.

5. The wheel accessory of claim 1 wherein said flange plate is provided with an integrally mounted wheel cover member.

6. The wheel accessory of claim 1 wherein said flange plate is provided with an integrally mounted axle cover member.

7. The wheel accessory of claim 1 wherein said flange plate is provided with a separate interfitting wheel cover member.

8. The wheel accessory of claim 1 further including a separate cap element adapted to fit within said central opening and to be retained therein when said mounting means is mounted on said vehicle wheel.

9. The wheel accessory of claim 1 wherein said first set of apertures comprises four apertures defining the four corners of an imaginary rectangle.

10. The wheel accessory of claim 1 wherein said apertures are circular.

11. The wheel accessory of claim 1 wherein said resilient washers are radially expandable washers.

12. The wheel accessory of claim 1 wherein said resilient washers are axially compressible washers.

13. The wheel accessory of claim 1 wherein said resilient washers are helically coiled strip washers.

14. The wheel accessory of claim 1 wherein said resilient washers are split ring washers.

15. The wheel accessory of claim 1 wherein said resilient washers are conical disc washers.

16. The wheel accessory of claim 1 wherein said resilient washers are made from materials selected from the group consisting of rubber, plastic and metal.

* * * * *